Figure 1:
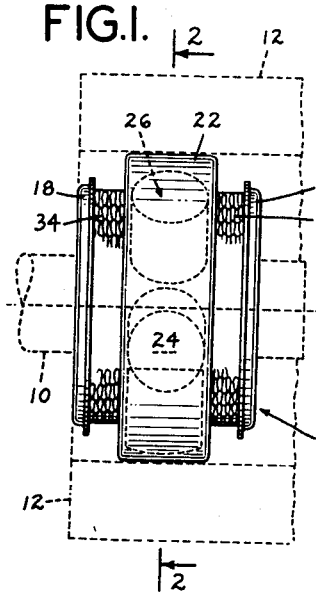

Jan. 15, 1963

C. R. DAVIS 3,073,557

SHOCK AND VIBRATION ISOLATING MOUNTINGS
FOR AIRCRAFT ENGINES AND THE LIKE

Filed Oct. 10, 1961

United States Patent Office 3,073,557
Patented Jan. 15, 1963

3,073,557
SHOCK AND VIBRATION ISOLATING MOUNTINGS FOR AIRCRAFT ENGINES AND THE LIKE
Charles R. Davis, Van Nuys, Calif., assignor to Robinson Technical Products, Inc., a corporation of New York
Filed Oct. 10, 1961, Ser. No. 144,185
2 Claims. (Cl. 248—5)

The present invention relates to shock and vibration isolating mounting devices particularly adapted for heavy duty service under severe operating conditions. These devices are especially useful in the mounting of heavy, powerful jet and similar engines in aircraft, inasmuch as they are very effective in reducing the amount of vibration and sound transmitted from the engines to the airframe and interior of the aircraft, while at the same time they are made entirely of metal and thus remain effective under the extremes of temperature normally encountered in such service. They are especially designed to be extremely small in size, light in weight and to require no maintenance throughout an extremely long service life.

The mounting devices of the present invention utilize cushions fabricated from metal wire in such manner that innumerable short spans of wire between points of contact of the wire with itself serve as delicate springs to isolate vibration. Deflection of the cushions under incrementally increasing loads, due to shock or vibration, is resisted nonlinearly, that is each successive increment of load causes less deflection of the cushion. This is because compression of the cushion causes increasing numbers of wire contact points, thus increasing the resistance to further deflection as a result of shortening and consequent stiffening of the spans, also with increasing internal friction due to rubbing of the wire upon itself at the contact points within the cushion. The cushion is thus self-damping and when properly designed for a given service may serve as a delicate isolater of vibrations, as a rugged absorber of severe shocks and as an inherently variable damper which is increasingly effective against increasing deflection to reduce excursions between parts at resonance or under heavy shock loading.

The devices of the present invention utilize the unique characteristics of such cushions in a particularly effective manner for multidirectional installations. To this end the cushions are so fabricated and arranged within the mounting that, when used for mounting an aircraft engine, for example, the optimum spring and damping characteristics are available for isolating vibrations originating in the engine and for absorbing heavy sustained or shock loading from any direction or directions due to motion of the aircraft, firing of weapons and the like.

In a simple embodiment of the present invention which has been chosen for illustration herein, an engine mounting adapted for positioning between a trunnion and a surrounding bracket or yoke incorporates a plurality of closely spaced cylindrical cushions arranged radially of the axis of the trunnion and a pair of tubular cushions extending axially of the trunnion with the inner ends thereof crenelated to provide semicircular pockets for receiving the cylindrical radial cushions, thus firmly interlocking all of the cushions in a permanent configuration. In this embodiment the optimum characteristics of both forms of cushion are available respectively in the two major directions with respect to the axis of the mounting.

Figure 2:
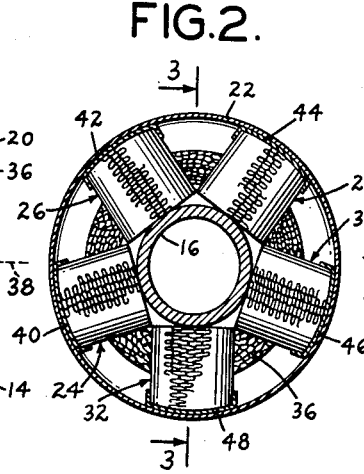
Figure 3:
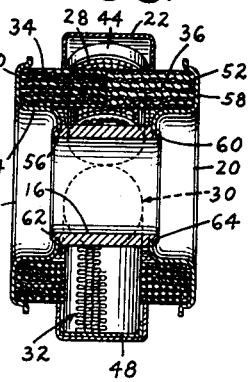
Figure 4:
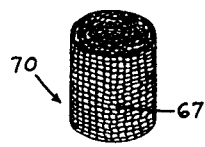
Figure 5:
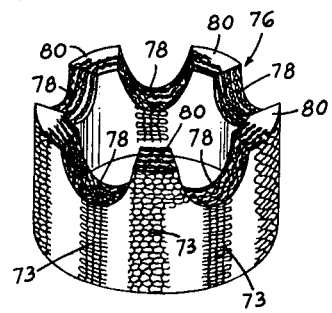
Figure 6:
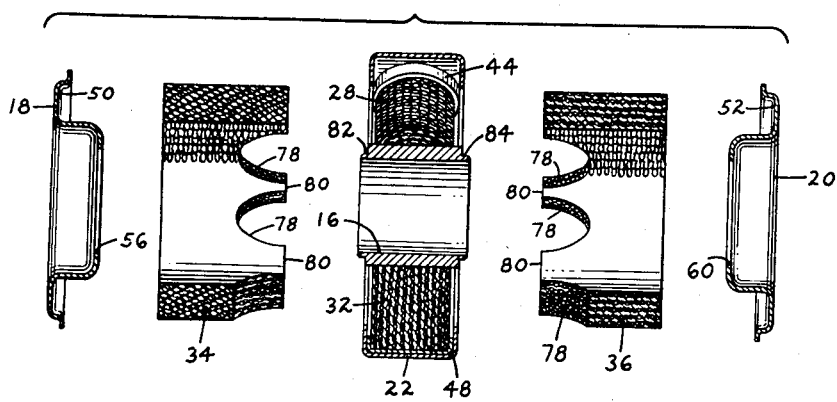

In the drawings:
FIG. 1 is an elevational view of a vibration and shock isolating mounting device embodying the present invention with a diagrammatic showing of typical associated engine and airframe parts;
FIG. 2 is a vertical section along the line 2—2 in FIG. 1;
FIG. 3 is a vertical section of the mounting device shown in FIG. 1, the section being taken along the line 3—3 in FIG. 2;
FIG. 4 is a diagrammatic, perspective view of a preferred form of cylindrical cushion which may be used in the device shown in FIG. 1;
FIG. 5 is similar to FIG. 4 showing a preferred form of hollow cylindrical cushion which may be used in said device; and
FIG. 6 is a sectional view similar to FIG. 3 showing certain parts in exploded relationship, prior to final assembly.

Referring now to the drawings, the mounting device of the present invention is shown in association with schematically indicated portions of two elements which are to be isolated with respect to vibrations. For example, these portions may comprise a cylindrical shaft or trunnion 10 secured to an aircraft engine and a surrounding trunnion cradle member 12 secured to or forming a part of the airframe. The mounting device 14 comprises a central portion including a tubular sleeve 16 (see FIG. 3) adapted to fit upon the trunnion 10 and flanges 18 and 20 secured to the opposite ends of sleeve 16. The outer portion of the mounting device comprises a trunnion ring 22 adapted to be secured to the trunnion cradle 12. Cylindrical cushions 24, 26, 28, 30 and 32 are positioned between the trunnion ring 26 and the sleeve 16 with the axes of the cylindrical cushions extending radially of the sleeve 16 as shown in FIG. 2. Hollow cylindrical cushions 34 and 36 extend, with their axes parallel to sleeve 16, between the flanges 18 and 20. As will be described below, the cushions 34 and 36 are formed with semicylindrical indentations at their inner ends so as to surround the radial cushions 24, 26, 28, 30 and 32, and to meet substantially in a plane defined by the longitudinal axes of said radial cushions. The trunnion ring 22 and the central parts 16, 18 and 20 are thus connected together only through the interlocked cushioning members just described, and relative movement therebetween causes deflection, distortion or compression or combinations thereof, of some or all of the cushions 24 through 36.

In a typical mounting system for an aircraft engine of one of the jet types the engine is provided with two trunnions such as the trunnion 10, projecting outwardly of the engine along a line which is horizontal with respect to the airframe and which passes through the center of gravity of the engine and extends transversely of the fore and aft axis of the aircraft. When the engine is mounted in the aircraft with the trunnions engaged in suitable trunnion cradle members, the cradle members assume gravity, yaw and thrust loads. Pitch loads, which would tend to cause rotation around the axis of the trunnions, are assumed by a third mounting device which may be in the form of a link (not shown herein) extending between the engine, toward the front or rear thereof, and the airframe. Lateral loads, which would tend to cause movement axially of the trunnions may be transferred to one or both of the trunnion cradle members as by flanges or flange and head combinations on one or both of the trunnions. The mounting devices of the present invention are admirably suited for use at the trunnions in mounting systems of the general type just discussed since such devices are specifically designed to support and absorb all of the types of loading encountered at the trunnions while isolating vibration and limiting the extent of, and damping relative movement due to, shock loads.

As shown in FIGS. 2 and 3, the trunnion ring 22 has secured to its inner periphery, as by spot welding, a plurality of shallow metal cups 40, 42, 44, 46 and 48 which are spaced around the trunnion ring 22 to receive the outer ends of the cylindrical, radially positioned cushions 24, 26, 28, 30 and 32 respectively. The inner ends of each of said cushions bear directly upon the outer surface of sleeve 16 and the cushions are preferably of such diameter as to engage one another at the inner ends. The combined effect of the cups 40, 42, 44, 46 and 48 and the mutual engagement of the cushions at their inner ends is to hold the cushions permanently in the desired radial array for operation in the direction of their longitudinal axes, which is the direction of optimum performance as will be further explained below. The radial cushions 24, 26, etc., are further stabilized in desired position by the interlocking thereof with the axially disposed cushions 34 and 36. The cups 40, 42, etc., are merely illustrative and their function may be performed by any suitable spacing or retaining means for the outer ends of the radial cushions.

As shown in FIG. 3, the cushions 34 and 36 are confined between the flanges 18 and 20. To this end the flange 18 includes an annular depression 50 to receive the outer end of cushion 34 while flange 20 includes a similar depression 52 to receive the outer end of cushion 36. The flange 18 is curved inwardly at 54 and terminates in a vertically disposed lip 56 which defines a circular opening of such size as to snugly fit over the sleeve 16. The flange 20 is similarly curved at 58 and is provided with a lip 60. When the device is assembled as will be described below, the flanges 18 and 20 are pressed inwardly to compress the cushions 34 and 36 and to bring the lips 56 and 60 over the opposite ends of sleeve 16 whereupon the sleeve ends are rolled over into the position shown in FIG. 3 to form heads 62 and 64 which hold the device in assembled condition.

As shown herein the sleeve 16 has a smooth internal surface to receive a trunnion and without further provisions the trunnion would be free to rotate and to move longitudinally within the sleeve 16. If the device is to assume transverse loading in one direction axially of the trunnions one of the trunnions may be provided with a flange or portion of enlarged diameter (not shown) to bear against one end of the sleeve 16. If the device is to assume transverse loads in both directions axially of the trunnions one or both of the trunnions may be flanged or stepped as just described for engagement with one end of sleeve 16 and may be further provided with a nut or other removable fastening device (not shown) to bear against the other end of sleeve 16. Obviously the trunnions may be fixed to the sleeve 16 in any other suitable manner when so desired.

In the mounting of jet engines in trunnion systems it is frequently desirable to transmit all transverse loads through one trunnion leaving the other trunnion free for limited axial movement relative to the airframe to permit expansion and contraction in diameter of the engine to occur without placing any additional stresses upon the engine or airframe. The mounting devices of the present invention may be utilized in this manner if so desired and the extremely wide design characteristics afforded by the present invention make it possible to place all lateral loads upon a single mounting device of extremely small size without the need for supplemental limiting or damping devices and with assurance of efficient vibration isolation under widely varying conditions.

The cushions 24, 26, 28, 30 and 32 preferably are made from metal wire as by compressing a bundle of wires or a bundle of fabric woven or knitted from wire into cylindrical form. The wire may be of any high strength springy metal but it is preferably resistant to rust and/or corrosion, and for this reason a stainless steel wire of suitable springy characteristics is preferred. The bundle of wire or wire fabric is so assembled prior to compression that a substantial percentage, preferably fifty percent or more, of the wire is in the form of individual "lengths," either separated or interconnected at their ends, which lie generally parallel with each other and with the axis of the cylinder into which the bundle is to be formed. Such "lengths" of wire preferably are crimped in closely spaced lateral curves to have a generally undulating shape and, when metal fabric is used, such crimping is present as a result of the weaving or knitting operation. Thus, each "length" will be much like a continuous flattened coil spring with the spring axis extending axially of the cylinder. The bundle is then compressed by pressure exerted in the direction of the axis of the cylinder. Sufficient pressure is applied to overcome the elastic limit of the wire at many points within the bundle to form a cushion of desired firmness. The compression will form or accentuate existing undulations in the "lengths" of wire. In either event there will be a very large number of points of contact of the wire with itself or with adjacent "lengths" and there will be a similarly large number of relatively short spans of wire extending between points of contact within the compressed body of the cushion. The cushion 70 is still springy particularly in the direction of its axis, because a very substantial number of the wire "lengths" still extend, in distorted condition, in directions generally parallel with such axis. Thus, deflection and recovery under changing axial forces over a wide range of design loads may be limited to such an extent as is needed for a particular use. For the present use the maximum deflection under maximum design load may be limited to a few thousandths of an inch.

In FIG. 4 there is shown in diagrammatic form a cushion 70 which has been formed and compressed as described above. The individual "lengths" of wire which extend axially of the cylindrical body of the cushion 70 are indicated at 67. It will be understood that such "lengths" ordinarily will not be as uniform in shape and distribution as might be implied from the drawings in which all of the figures are as accurate as conventional drafting technique permits.

For use in the mounting device shown in FIGS. 1, 2 and 3, it may be preferred to prepare compressed cushions 70 having an axial length, under no load, slightly greater than the axial length assumed by the cushions 24, 26, etc., in the final assembly. Accordingly, the unloaded cushions are first positioned in their respective cups 40, 42, etc., and a tapered mandrel (not shown) is inserted in the central space defined by the inner ends of the radial cushions. The mandrel is then forced into the central space to further compress the cushions axially, but within their elastic limit, to positions in which the sleeve 16 may be inserted progressively as the mandrel is withdrawn. When the sleeve 16 is in final position the cushions 24, 26, etc., are thus pre-stressed within their design limits.

In FIG. 5 there is shown a cushion 76, a pair of which may be used as the axial cushions 34 and 36 in the device shown in FIGS. 1, 2, 3 and 6. The cushion 76 may be fabricated in much the same manner and from the same types of metal wire materials as the cushion 70. In this case however the metal wire or fabric is first formed into a hollow cylindrical bundle. A substantial portion of the individual "lengths" 73 of wire, which as discussed above may be separate or interconnected at their ends, are arranged to extend lengthwise of the axis of the hollow cylinder. The bundle is compressed in a conventional press having a die with a central core (not shown) and a plunger (not shown) to impart to it the shape illustrated in FIG. 5. The compressive force is exerted axially of the hollow cylindrical body and either the plunger or the die may be so shaped as to form on one end of the cushion 76 an appropriate number of notches 78 each of which is shaped to constitute the intersection between one of the radial cushions 24, 26, etc., and the hollow cylindrical body 76 in the final assembly. As will be apparent from FIG. 5, the individual "lengths" of wire 73 have been compressed lengthwise and those wires 73 which extend into a notch 78 will be more extensively compressed than those wires 73 which extend into a crest 80 between the notches 78.

Preferably the axial length of the body 76, measured to the tops of the crests 80 is greater by a predetermined amount than the axial length which the body 76 is to assume when it is installed as a cushion 34 or 36 in the completed mounting device as illustrated in FIGS. 1, 2 and 3. In this manner the amount of pre-stressing placed upon the cushions 34 and 36 may be predetermined.

Referring now to FIG. 6, the mounting device of the present invention is illustrated in a partially assembled condition. The radial cushions 24, 26, 28, 30 and 32 have been positioned in their respective cups 40, 42, 44, 46 and 48, and the sleeve 16 has been positioned between the inner ends of the radial cushions as described above. The sleeve 16 is provided with portions 82 and 84 of reduced diameter to receive the inner peripheries of the lips 56 and 60, respectively of the flanges 18 and 20. The cushions 34 and 36 with the notches 78 in proper alignment with the radial cushions are next inserted so that the crests 80 thereof meet in the central plane of the mounting device. The flanges 18 and 20 are now pressed from opposite sides against the cushions 34 and 36 and by the use of appropriate forces in the press the cushions 34 and 36 are compressed axially of the sleeve 16 until the flanges 18 and 20 seat upon the end portions 82 and 84 of the sleeve 16. As described above, the ends of sleeve 16 are then rolled to form the locking beads 62 and 64 shown in FIG. 3.

In the final assembly, as illustrated in FIGS. 1, 2 and 3, the individual "lengths" 73 of wire which extend axially of the hollow cylindrical cushions 34 and 36 provide a very large number of relatively short spans of wire extending between contact points and which are particularly effective as vibration isolating springs in the direction of the axis of said cushions. The cushions 34 and 36 also have the desirable characteristics of non-linear response to shock loads and increasingly effective damping of excursions, all as described above in connection with the radial cushions. Thus, the mounting device of the present invention utilizes the optimum characteristics of the cushions 34 and 36 as well as the optimum characteristics of the radially disposed cushions 24, 26, etc. Furthermore, the interlocking of the cushions 24, 26, etc., within the notches 78 of the cushions 34 and 36 provides a stable, all metal, resilient structure in which the response characteristics to vibratory, shock and gravity forces having components falling upon one or both of two perpendicularly intersecting axes may be independently established for optimum overall performance.

As used in this specification and claims, the words "individual lengths of wire" are intended to include the generally parallel segments of one or more very long wires turned back and forth upon themselves as is the case in certain types of fabrics since, in the cushions herein described such "lengths" individually extend continuously from one axial end of the cushion to the other.

What is claimed is:

1. A mounting device for isolating vibration and shock between two bodies such as an aircraft engine and an airframe comprising an inner member adapted to be secured to one of said bodies and an outer member adapted to be secured to the other of said bodies, said inner member having a cylindrical outer surface and said outer member having a cylindircal inner surface, a plurality of cylindrical cushions with the longitudinal axes thereof extending radially outwardly from said inner member, the inner end of each of said cylindrical cushions bearing against the cylindrical outer surface of said inner member, means for holding the outer ends of said cylindrical cushions in uniformly spaced relation circumferentially of the inner surface of said outer member, a pair of hollow cylindrical cushions having their longitudinal axes extending parallel with the axis of the cylindrical outer surface of said inner member, each of said hollow cylindrical cushions having formed on the inner end thereof a plurality of notches adapted to receive and snugly surround one-half of the diameter of each of said radially disposed cylindrical cushions and the inner ends of said hollow cylindrical cushions being in engagement with each other in the spaces between said cylindrical cushions and in a plane substantially coincident with the longitudinal axes of said cylindrical cushions, and means secured to said inner member for holding said hollow cylindrical cushions by engagement with the outer ends thereof, whereby loads tending to cause relative movement between said inner member and said outer member in directions axially of the cylindrical surfaces thereof will cause axial compression of said hollow cylindrical cushions and loads tending to cause relative movement between said inner member and said outer member in directions radially of the cylindrical surfaces thereof will cause axial compression of said cylindrical cushions, each of said cushions consisting of a compressed mass of springy metal wire in which a substantial amount of the wire consists of transversely crimped individual lengths of wire extending generally parallel with each other and with the cylindrical axis of the cushion.

2. A mounting device for isolating vibration and shock between two bodies such as an aircraft engine and an airframe comprising an inner member adapted to be secured to one of said bodies and an outer member adapted to be secured to the other of said bodies, said inner member having a cylindrical outer surface and said outer member having a cylindrical inner surface, a plurality of cylindrical cushions with the longitudinal axes thereof extending radially outwardly from said inner member, the inner end of each of said cylindrical cushions bearing against the cylindrical outer surface of said inner member, a plurality of cups secured to the inner surface of said outer member and spaced circumferentially thereof to receive respectively the individual outer ends of said plurality of cylindrical cushions, a pair of hollow cylindrical cushions having their longitudinal axes extending parallel with the axis of the cylindrical outer surface of said inner member, each of said hollow cylindrical cushions having formed on the inner end there of a plurality of alternating high and low areas with the low areas engaging said radially disposed cylindrical cushions from opposite sides thereof in a direction transverse the axis of said cylindrical cushions and the high areas of the inner ends of said hollow cylindrical cushions being in engagement with each other in the spaces between said cylindrical cushions, and flanges secured to opposite ends of said inner member and having annular recesses receiving the outer ends of said hollow cylindrical cushions for holding said hollow cylindrical cushions, whereby loads tending to cause relative movement between said inner member and said outer member in directions axially of the cylindrical surfaces thereof will cause axial compression of said hollow cylindrical cushions and loads tending to cause relative movement between said inner member and said outer member in directions radially of the cylindrical surfaces thereof will cause axial compression of said cylindrical cushions, each of said cushions consisting of a compressed mass of springy metal wire in which a substantial amount of the wire consists of transversely crimped individual lengths of wire extending generally parallel with each other and with the cylindrical axis of the cushion.

References Cited in the file of this patent

UNITED STATES PATENTS

| | | |
|---|---|---|
| 2,420,452 | Strachovsky | May 13, 1947 |
| 2,600,090 | Barber | June 10, 1952 |
| 2,638,303 | Pietz | May 12, 1953 |
| 2,869,858 | Hartwell | Jan. 20, 1959 |
| 2,924,419 | Wells | Feb. 9, 1960 |